United States Patent [19]

Hall

[11] Patent Number: 4,639,552

[45] Date of Patent: Jan. 27, 1987

[54] APPARATUS FOR CONVERTING A STANDARD TELEPHONE TO AN UNLISTED NUMBER TELEPHONE

[76] Inventor: Leon Hall, 1520 E. 43rd St., Tulsa, Okla. 74105

[21] Appl. No.: 710,003

[22] Filed: Mar. 8, 1985

[51] Int. Cl.⁴ .............................................. H04M 1/57
[52] U.S. Cl. ................................. 379/199; 329/200; 329/373; 329/386
[58] Field of Search .............. 179/84 R, 84 VF, 84 C, 179/84 SS, 84 T

[56] References Cited

U.S. PATENT DOCUMENTS

| | | | |
|---|---|---|---|
| 3,784,721 | 1/1974 | Kilby | 179/84 C X |
| 4,266,098 | 5/1981 | Novak | 179/84 C X |
| 4,405,839 | 9/1983 | Groff | 179/84 C |
| 4,409,439 | 10/1983 | Gamble | 179/84 SS X |
| 4,429,188 | 1/1984 | Allen | 179/84 C |
| 4,446,334 | 5/1984 | Groff | 179/84 C X |

*Primary Examiner*—James L. Dwyer
*Attorney, Agent, or Firm*—Head, Johnson & Stevenson

[57] ABSTRACT

The apparatus of this invention is a system which is attached to a standard telephone instrument at a receiving station. When a call comes from a transmitting station through a switching station, this call is received in this apparatus, which signals the transmitting station to send its private code. After validating this code, it serves to indicate information about the transmitting station. The receiving station then has the option to answer or not to answer.

2 Claims, 1 Drawing Figure

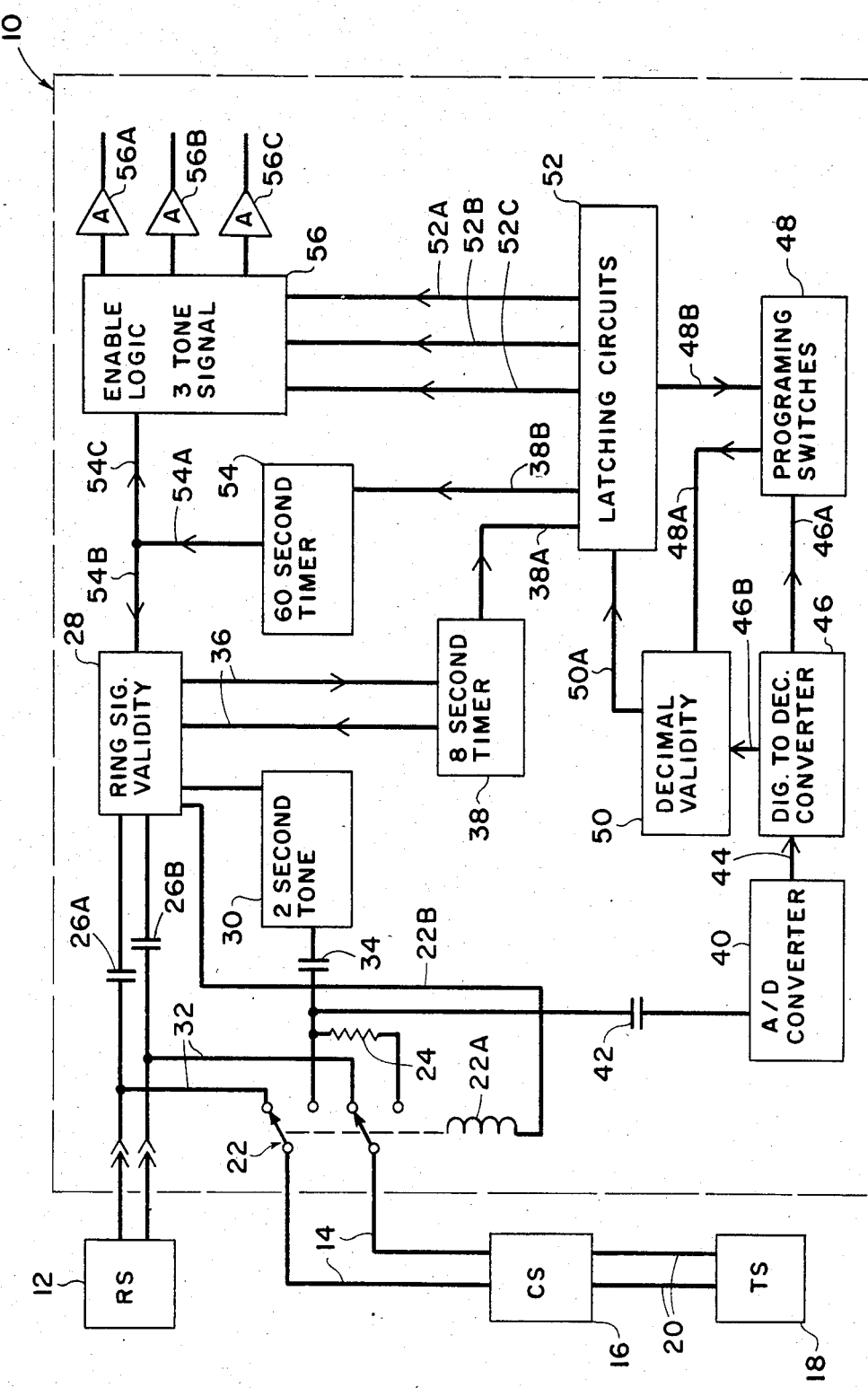

APPARATUS FOR CONVERTING A STANDARD TELEPHONE TO AN UNLISTED NUMBER TELEPHONE

BACKGROUND OF THE INVENTION

Field of the Invention

This invention lies in the field of telephone apparatus. More particularly, it concerns electronic circuitry that can be connected to a receiver station for determining when the caller is one of a selected group of persons who have been given a private code number in order to make contact with the receiving station.

No change is required in the conventional telephone instrument which is still used in its proper way but is connected to the telephone line and to the central station in shunt with an electronic control circuit.

SUMMARY OF THE INVENTION

It is a primary object of this invention to provide a simple convenient compact electronic package that can be connected to the incoming wire line from the central station to the receiving station.

When an incoming call is received, the ringing tone will start, and the first operation is to verify that the ringing signal is valid. If so, then a number of separate actions take place. First, a tone signal is placed on the line so that the transmitting station knows that the receiving station is ready to receive his code signal transmission. He then transmits his code number with a DTMF (Dual Tone Multi-frequency) telephone dialing instrument.

These analog signals are converted to binary digital signals and then to decimal digital signals. A plurality of a selected number of programmable switches are provided in tandem such that as these code numbers come in they pass through these switches and the validity of the decimal number is checked against the switch setting. If this is correct then a latch is set. When the total number of decimal digits have been received which may be any selected total number, all of the latches will be set and according to the preset switches, suitable logic circuits will control one or more of a plurality of tones which will then be amplified and placed on a suitable sound source so that the receiving station being called can determine from the corresponding tones which of a certain group of selected callers the present caller is from.

The person at the receiving station then has the option of picking up the receiver and talking with the transmitting station. When this is done, the electronic circuits are all reset so that when this conversation is completed, the instrument will be in condition to receive another call, and so on. If the person is not at the receiving station, then the tones will sound for a selected period of time and then the circuits will be automatically disabled, placing the instrument back into a receptive condition for the next call.

BRIEF DESCRIPTION OF THE DRAWING

The drawing is a block schematic diagram of a telephone number converting apparatus embodying the invention.

DESCRIPTION OF THE PREFERRED EMBODIMENT

Before explaining in detail the present invention, it is to be understood that the invention is not limited in its application to details of the construction and arrangement of parts illustrated in the accompanying drawing. The invention is capable of other embodiments and of being practiced or carried out in a variety of ways. It is to be understood that the phraseology and terminology employed herein is for the purpose of description and not of limitation.

Referring now to the drawing, there is shown in schematic outline block diagram, one embodiment of this invention. There are several choices that can be made in various parts of the system, such as the length of time that will be permitted for the transmission of the code numerals and the number of numerals in the code, the number of different codes that can be set up in the same switches, and how long the final tone signals will be permitted to run before the instrument is reset and so on.

In the FIGURE, the box shown generally by the numeral 10 is the container which has all of the necessary parts of the equipment that are required to modify a conventional telephone instrument into a substantially private line telephone. In the FIGURE are shown several boxes, such as numeral 12, which is the receiving station telephone instrument, number 16 which represents the central station or switching station that connects the transmitting station to a desired receiving station, and the box 18 which represents the transmitting station telephone instrument. No changes are made in the telephone instruments or the line, although provision is made in the device for entry of the line 14, and leads from the receiving instrument.

The first thing that happens at the receiving telephone when a call is coming in is that there is a ringing signal on the line 14. This is an alternating current signal that provides power for ringing the bell to indicate that there is a telephone call coming in. The first step in the operation of this device is to provide a circuit 28 which will be called a ring signal validity check. In other words, this box 28 is capacitively coupled by capacitors 26A and 26B across the line 32 which goes to the receiving station and also to the line wires 14.

A switching means indicated generally by the numeral 22 comprises a relay or equivalent, control switch means bypassing current through a coil 22A, for example, that will connect the contacts of the relay from one pair of terminals to another. One pair of terminals are carried on line 32, the other pair of terminals have a load resistance 24 of selected value connected across them. When the validity of the ring signal is determined, a signal is sent back along line 22B to the relay coil 22A, for example. While any kind of electronic switch can be used, a simple relay will do as well as any and is, of course, very easily understood. Switching the load resistance 24 across the line terminals 14 tells the central station or indicates to the central station the same effect as if the telephone receiver were lifted, thus switching. The relay 22A indicates to the central station by the line conductors 14 that the telephone has been lifted and the ring signal is stopped.

At the same time, the ring signal validity check initiates a tone signal in the box 30 which is capacitively coupled 34 to the line 14 when the switch has been closed and this tone signal then will go to the transmitting station and will indicate to the person initiating the call that he must then send his personal code signals which comprise a selected number of a selected variety of decimal digits in the proper order, etc.

In the box 10 there are programmable switches in box 48 which can be preset to indicate certain decimal digits in a selected order, which would be identical to the code number of the transmitting station. Thus, when the tone set up by box 30 and applied to the line by the capacitor 34, is received at the transmitting station 18, the person then starts immediately to transmit the decimal digits that comprise his code. This may be two or three or five or six or more decimal digits in a selected sequence. Actually, the number of switches can be more than six, as has been suggested in the drawing, so that by using two digits for each of three callers it will be possible then to tell which of three groups of callers is calling.

So the decimal digits transmitted become analog signals on the line 20 to the central station and out on line 14 to the receiving station and these go by capacitive coupling 42 to an analog-to-digital converter 40. This provides a binary digital number corresponding to the code. This is further converted by lead 44 to the box 46 which provides a binary digit to decimal digit converter. The decimal digit signal then passes by line 46B up to a decimal validity check, and it also goes to the programmable switches so that the switch connections going by lead 48A to the decimal validity check 50 make it possible to determine that the code as transmitted coresponds exactly with one of the groups of persons who have a personal code number. When this validity check of the decimal digits and the switch settings are compared, if they do not correspond, then the number representing the switch setting is incorrect and the caller is disconnected, if they correspond, then that number representing that first switch is correct and that closes a latch along one of the leads 52A, 52B, 52C. After all of the decimal digits have been checked, then all of the latches should be set and then with the latches set and the lines 52A, 52B, 52C going to the enable logic 56, this sets up certain tones corresponding to the particular code number and those signals are amplified in amplifiers 56A, 56B and 56C and they go to a suitable sound source which is not shown, but well known in the art.

While I have described the essential parts of the circuit diagram of the figure in terms of function, it turns out that each of these circuit components are commercial semiconductor chips which are identified by part number, and can be purchased over the counter. For example:

| DRAWING PART NO. | COMPRISES PART NO. | PART NAME |
|---|---|---|
| 28 | | |
| 30 | | Dual Timer |
| 40 | SS1 | Tone Decoder |
| 38 | | Dual Timer |
| 52 | | Flip Flops |
| 48 | | Dip Switches |
| 46 | | |
| 50 | | |
| 54 | | |
| 56 | 7408 | And Gate |
| etc. | | |

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein, but is to be limited only by the scope of the attached claim or claims, including the full range of equivalency to which each element thereof is entitled.

What is claimed is:

1. Apparatus for converting a standard telephone system including a conventional telephone instrument at a transmitting station (TS) which is conventionally connected by wire conduit to a central station (CS); and a receiving station (RS) having a conventional telephone instrument connected by conventional wire line to said central station;

the improved apparatus adapted to be attached to said RS which would convert it to an unlisted number telephone, comprising:

(a) switch means adapted to switch resistive load means across said line at the RS;

(b) first validity test means capacitance coupled to the line at said RS to recognize the wave shape of a conventional ringing signal, and to determine its validity;

(c) means responsive to said first validity test means, to produce for a selected time interval a selected first tone signal and apply it to said line;

whereby responsive to receiving this first tone signal at said TS, the TS, via a DTMF system, transmits to said RS a private code which may be one or more decimal digits in a selected successive order; whereby said dialed numbers will produce a pattern of tones received at said RS;

(d) capacitive coupled to said line at said RS in an analog to digital converter means (A/DC) and digital to decimal converter means (D/DC) for producing a series of decimal digit signals which pass to a second validity check means, to check that the dialed digits are valid;

(e) a plurality of settable switches are connected serially to the output of said A/DC and D/DC;

(f) third validity test means to determine that each successive decimal digit corresponds completely to the numbers set into said successive swtiches; and means responsive to each successive validation of a switch to set a corresponding latch; and (g) responsive to said set latches, logic means to enable one of a selected number of tone generators to apply their signals to a sound source;

whereby the operator of said RS can determine from the particular tone or tones, which one of a selective group of possible callers, the present call is from, and whether or not he wants to speak with said caller.

2. The apparatus as in claim 1 and including means after a selected time period to disable the circuit and place it in condition to receive another call.

* * * * *